(12) United States Patent
Chou et al.

(10) Patent No.: US 10,420,287 B2
(45) Date of Patent: Sep. 24, 2019

(54) POLE ASSEMBLY FOR VEGETATION CUTTING TOOL

(71) Applicant: BLACK & DECKER INC., New Britain, CT (US)

(72) Inventors: Mark Chou, Perry Hall, MD (US); Bojun Shi, Suzhou (CN); Kejia Wang, Suzhou (CN); Xiubao Lan, Suzhou (CN)

(73) Assignee: Black & Decker, Inc., New Britain, CT (US)

( * ) Notice: Subject to any disclaimer, the term of this patent is extended or adjusted under 35 U.S.C. 154(b) by 304 days.

(21) Appl. No.: 15/059,740

(22) Filed: Mar. 3, 2016

(65) Prior Publication Data

US 2017/0251608 A1    Sep. 7, 2017

(51) Int. Cl.
*A01G 3/053*   (2006.01)
*A01G 3/08*    (2006.01)

(52) U.S. Cl.
CPC ............. *A01G 3/053* (2013.01); *A01G 3/086* (2013.01)

(58) Field of Classification Search
CPC ......... A01G 3/08; Y10S 30/03; Y10T 16/473; Y10T 16/4719; B26B 17/0008; B25F 5/02
USPC ........ 30/216, 296.1, 166.3, 381, 277.4, 517, 30/DIG. 1, 519, 210, 228, 272.1, 340, 30/383; 439/680, 678, 677, 135, 481; 56/12.7; 220/332.3; 16/427, 429, 422; 320/115
See application file for complete search history.

(56) References Cited

U.S. PATENT DOCUMENTS

| | | | |
|---|---|---|---|
| 2,748,476 A * | 6/1956 | Cooper | A01G 3/037 30/198 |
| 3,579,827 A * | 5/1971 | Grahn | A01G 3/053 30/144 |
| 3,731,380 A * | 5/1973 | Mathiesen | A01G 3/08 30/381 |
| 3,805,385 A * | 4/1974 | Ritums | A01G 3/067 30/220 |
| 3,973,179 A | 8/1976 | Weber et al. | |
| 4,050,003 A | 9/1977 | Owings et al. | |
| 4,207,675 A * | 6/1980 | Causey | A01G 3/08 30/296.1 |
| 4,330,938 A * | 5/1982 | Martin | E04D 15/00 299/37.1 |
| 4,515,423 A | 5/1985 | Moore et al. | |
| 5,070,576 A * | 12/1991 | Banta | A01G 3/053 16/427 |

(Continued)

OTHER PUBLICATIONS

EP Search Report dated Jul. 25, 2017, for EP Application No. 17156620.1.

*Primary Examiner* — Ghassem Alie
(74) *Attorney, Agent, or Firm* — John Yun (57) ABSTRACT

The present invention is directed to a small hand-held garden tool, for example a hedgetrimmer, having an electrically powered powerhead, and a detachable pole assembly. The powerhead can be used alone to cut nearby vegetation or in combination with a pole assembly to reach vegetation farther away. The powerhead has a separate handle and motor chamber, with the pole assembly being secured to the motor chamber. Actuation of the powerhead is controlled by a trigger on the handle. However, when connected to the pole assembly, actuation of the powerhead is controlled by a second trigger on the pole assembly.

5 Claims, 10 Drawing Sheets

(56) References Cited

U.S. PATENT DOCUMENTS

| | | | |
|---|---|---|---|
| 5,787,590 A | * | 8/1998 | D'Alessandro, Sr. .................... A01G 3/053 16/429 |
| 5,802,724 A | | 9/1998 | Rickard et al. |
| 5,809,653 A | | 9/1998 | Everts et al. |
| 5,884,403 A | * | 3/1999 | Rogers ................ B27B 17/0008 144/24.13 |
| 6,181,032 B1 | | 1/2001 | Marshall et al. |
| 6,349,712 B1 | * | 2/2002 | Halstead ................ B28D 1/045 125/12 |
| 6,474,747 B2 | | 11/2002 | Beaulieu et al. |
| 7,484,300 B2 | | 2/2009 | King et al. |
| 7,989,718 B1 | * | 8/2011 | Weber .................... B23B 39/10 200/310 |
| 8,136,254 B2 | | 3/2012 | Gieske et al. |
| 2005/0086813 A1 | | 4/2005 | Champlin |
| 2006/0005673 A1 | | 1/2006 | Long et al. |
| 2008/0196256 A1 | | 8/2008 | Gieske et al. |

* cited by examiner

POLE ASSEMBLY FOR VEGETATION CUTTING TOOL

FIELD OF THE INVENTION

The invention relates generally to a multi-purpose electrically powered hand-held garden tool for cutting vegetation that can be used alone or attached to a pole assembly for extending the reach of the tool.

BACKGROUND OF THE INVENTION

Most current powered garden tools are hand-held tools used to cut vegetation near the user. However, oftentimes tall bushes or trees are present and a user needs to be able to reach distant growth. In those cases, users often have separate tools with integrated poles to allow the user to reach the vegetation. However, for many garden tools, such as a hedgetrimmer, the tool's weight and size make controlling and using such a tool difficult. For example, most hedgetrimmers have blade lengths of 18 inches or longer. This issue is exacerbated with gasoline powered tools where the weight of the engine and gasoline contribute significantly to the weight and size of the tool.

With respect to electrical tools, they are an improvement over gasoline powered tools as electric motors are typically much lighter than gas engines. However, electric tools, which can be either cordless (eg. battery powered) or corded, have their own disadvantages. Battery powered electric tools have the added weight of a battery, and corded electric tools have to contend with cords which can become tangled and cumbersome to pull around.

Furthermore, all of the above types of tools have the challenge of how to acutate the tool when attached to a pole assembly. When used alone, the tool is controlled by a trigger or other actuation means on the tool itself, however, when attached to a pole the tool is separated from the user, and the user needs a way of actuating the tool from the pole. Therefore, the pole itself must have a separate trigger or actuation means.

Therefore, it would be desirable to have a small garden tool, such as a hedgetrimmer, that is lighter weight and easy to manoeuvre for use individually and when attached to a pole. Furthermore, it would be desirable to have a simple and cost effective method of attaching and actuating a tool from a pole.

BRIEF SUMMARY OF THE INVENTION

In light of the above need, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

The powered garden tool includes a powerhead having a housing with a main handle and a motor chamber, and a pole assembly adapted to be releasably connected to the powerhead housing to extend the reach of the blade assembly. The main handle includes a trigger to allow actuation of the tool when the pole assembly is not attached. When the pole assembly is attached, the powerhead is electrically connected to the pole assembly, which includes a second trigger to actuate the tool.

The present invention further includes powerhead housing where the main handle and motor chamber are separated, and extend rearwardly from a front portion of the housing parallel to one another.

The pole assembly further includes a coupling member for securing it to the powerhead. The coupling member is secured to the motor chamber of the powerhead, with the components being keyed to one another so that the powerhead is properly aligned with the pole assembly when attached.

BRIEF DESCRIPTION OF THE INVENTION

Further features and advantages of the present invention will be better understood by reference to the following description, which is given by way of example and in association with the accompanying drawings, in which.

DETAILED DESCRIPTION OF THE INVENTION

Figure 1:
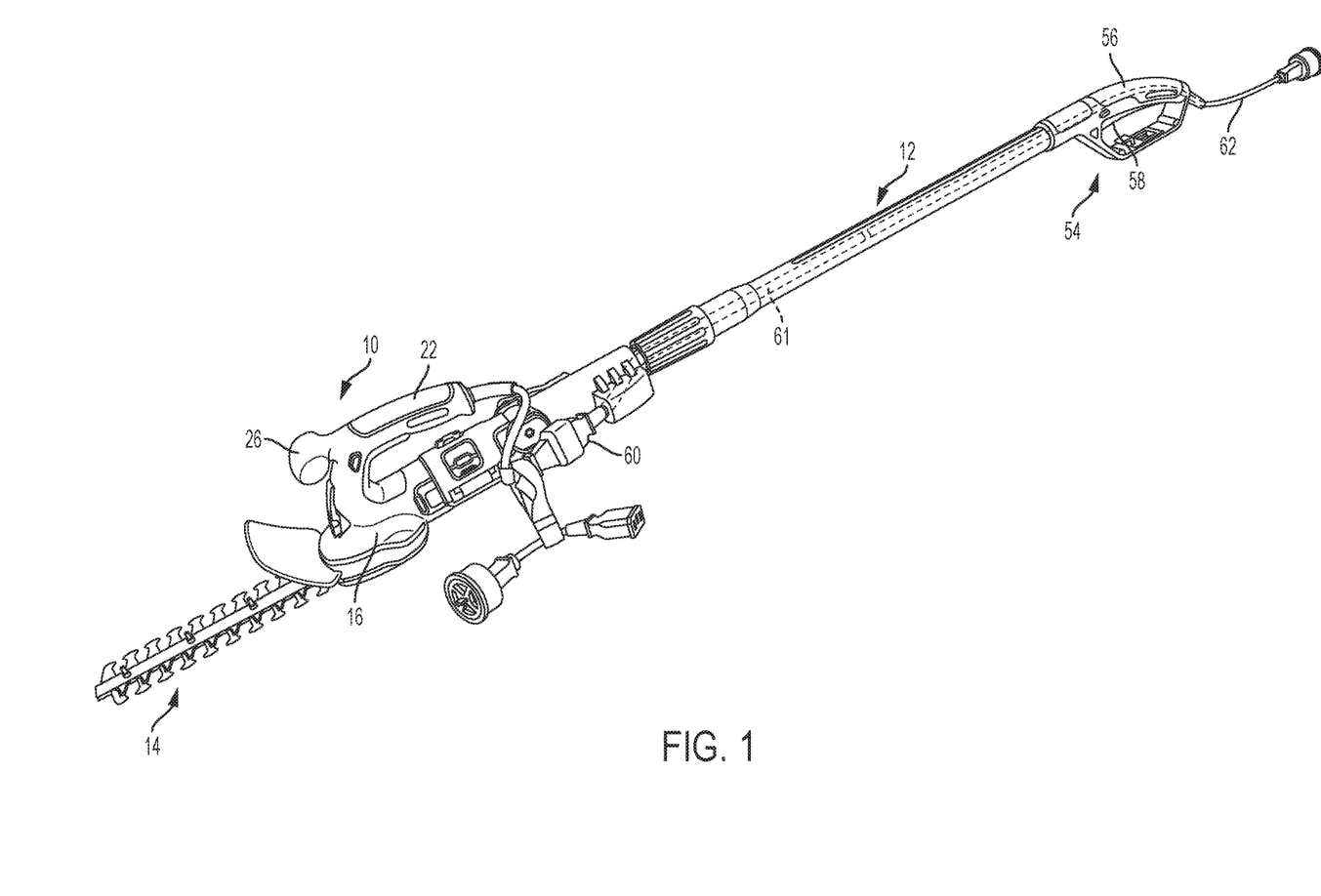
FIG. 1 is a perspective view of a vegetation cutting tool attached to a pole assembly according to an embodiment of the invention.
Figure 2:
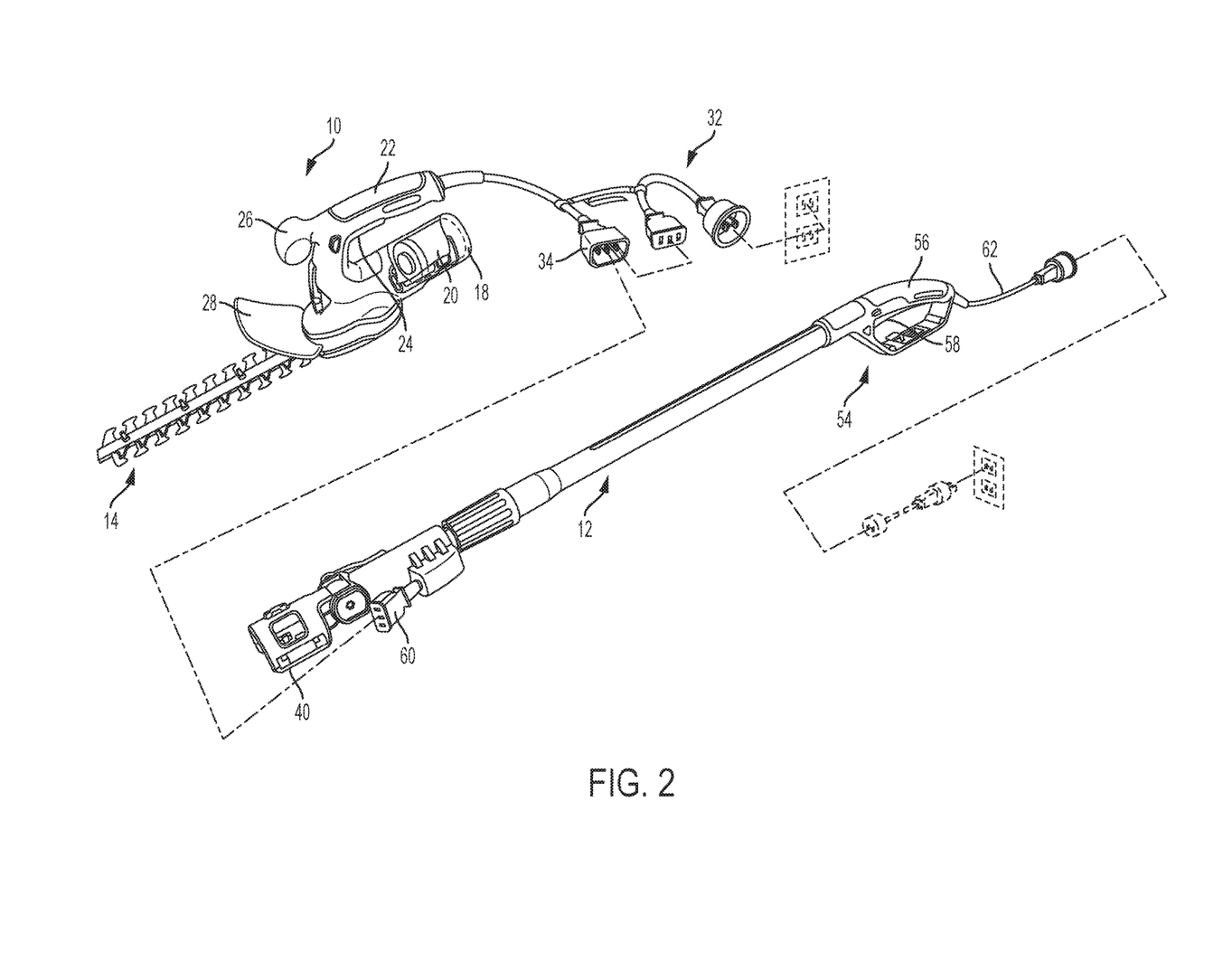
FIG. 2 is a perspective view of FIG. 1 with the powerhead separated from the pole assembly.

The present invention is directed to a vegetation cutting tool having a powerhead 10 and an extensible pole assembly 12 as shown in FIGS. 1 and 2. FIG. 1 shows the pole assembly 12 secured to the powerhead 10 while FIG. 2 shows them separated.

Figure 3:
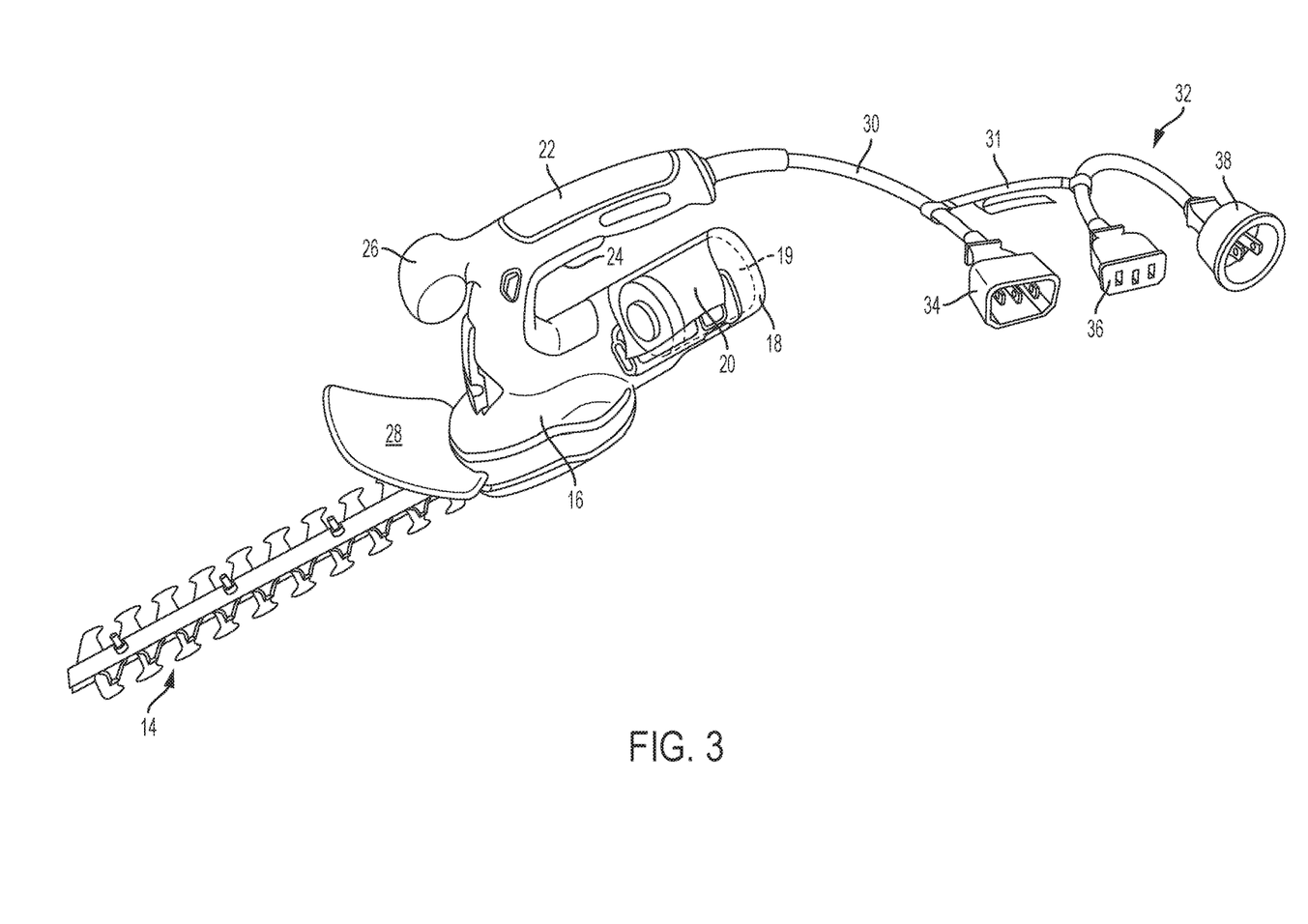
FIG. 3 is a perspective view of the powerhead of FIG. 1.

The powerhead 10, as best shown in FIG. 3, is a hand-held tool with a blade assembly 14 extending out from a housing 16. The blade assembly 14 is shown as a hedgetrimmer blade made up of a pair of reciprocating blades that produce a shearing action to cut vegetation. The blade assembly shown in the figures is approximately 8 inches long, and is shorter than conventional hedgetrimmer blades which are typically 18 inches or longer. It should be understood however that other blade types and lengths may be used and fall within the scope of the present invention. Furthermore, the tool can have an interchangeable blade system that allows other blade assemblies, such as a shearing blade, to be swapped for the hedgetrimmer blade assembly as well.

The housing 16 includes a motor chamber 18 that holds an electric motor 20 for powering the blade assembly 14. The housing 16 also includes a main handle 22, positioned above and parallel to the motor chamber 18, for a user to grip the tool. The main handle 22 includes a trigger 24 for actuating the motor 20. Positioned adjacent the main handle 22 is a support handle 26 to provide additional control for the tool.

Positioned just forward of the support handle 26 is a safety guard 28 for shielding the user's hand from the blade assembly 14.

Referring now to FIGS. 2 and 3, extending from the rear of the main handle 22 is a power cord 30 for providing electrical power to the motor 20. An adapter cord 32 is tethered to the power cord 30 using a Velcro strap 31 or other similar attachment means. The power cord 30 has a three-pronged connector 34 which can be connected to the adapter cord 32 (or a corresponding connector 60 on the pole assembly 12, as discussed later).

A first end of the adapter cord 32 has a connector 36 that corresponds to the connector 34 for connection therewith, and second end with a standard two-pronged electrical plug 38 that can be connected to an extension cord (not shown) or into a wall outlet for providing power. In this way, when the cutting tool is used alone as a hand-held unit, e.g. without the pole assembly 12, the power cord 30 is connected to the adapter cord 32, which is plugged into an electrical outlet. In this configuration, power to the motor 20 is controlled by trigger 24 on the main handle 22.

Figure 1B:
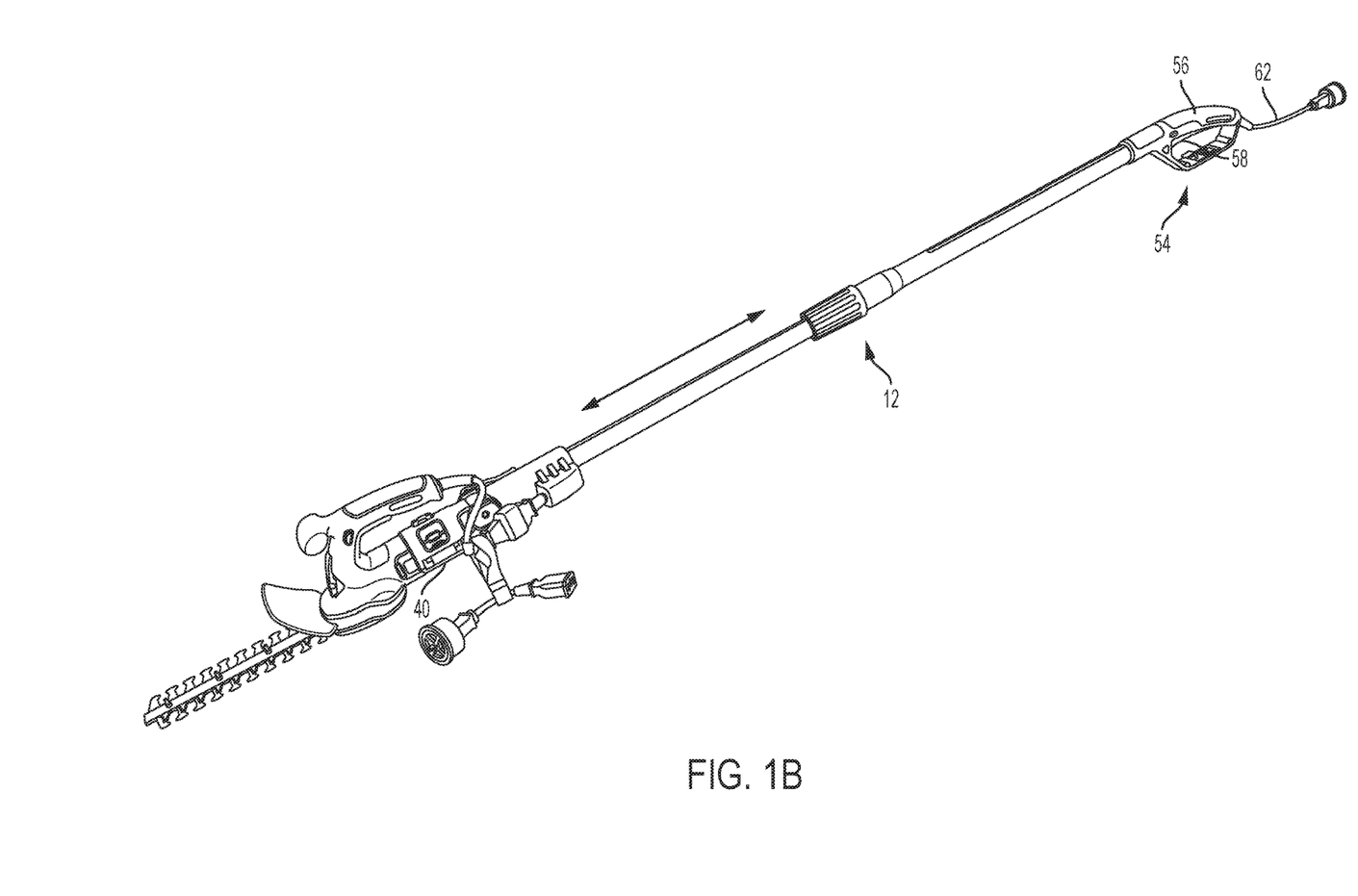
FIG. 1B is a perspective view of the vegetation cutting tool of FIG. 1 with the pole assembly in an extended position.

Referring now to FIGS. 1 and 2, the pole assembly 12 is shown attached and detached from the powerhead 10, respectively. The pole assembly 12 is also telescopic and can be extended, as shown in FIG. 1B. A first end of the pole assembly 12 has the connector 60 and a coupling member 40. A second end of the pole assembly includes a second handle 54 that allows the user to control the powerhead 10 when connected to the pole assembly 12. The second handle 54 includes a gripping portion 56 and a trigger 58. A standard two-pronged power cord 62 is located on the second handle 54 and plugs into a wall outlet or to an extension cord to deliver electricity to the power head 10. An electrical wire 61 located within the pole connects the power cord 62 to the connector 60.

Figure 4A:
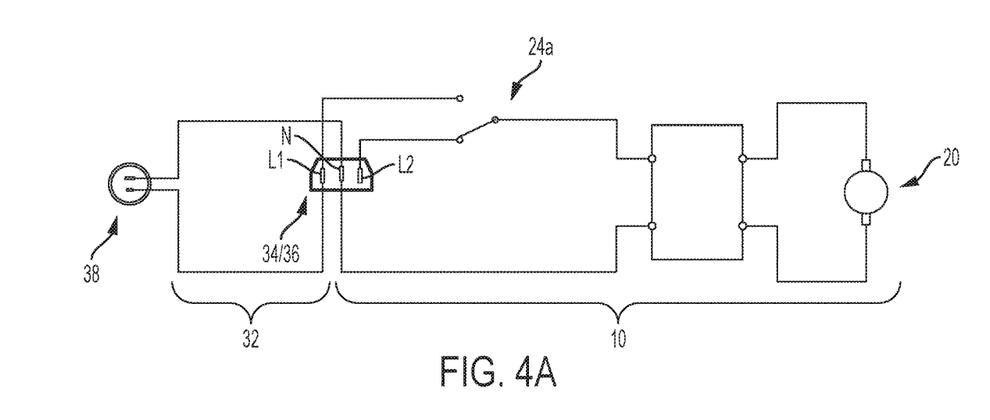
FIG. 4A is a wire diagram of the powerhead.
Figure 4B:
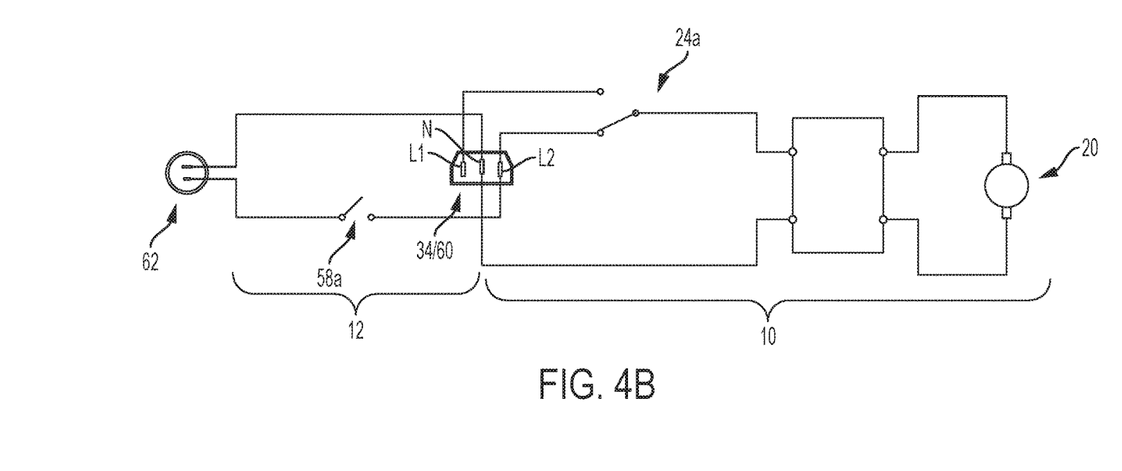
FIG. 4B is a wire diagram of the powerhead when attached to a pole assembly.

FIG. 4A shows a wire diagram of the powerhead 10 when connected to the adapter cord 32 and FIG. 4B shows a wire diagram of the powerhead 10 when connected to the pole assembly 12. Referring to FIG. 4A, the powerhead 10 is shown with, a motor 20 electrically connected to the adapter 32 via the three pronged connection at connector 34 and 36. The three prongs are labelled L1, N, and L2, The trigger 24 of the powerhead 10 actuates a switch 24a to turn the motor on an off. FIG. 4A shows the switch 24a in the "off" position so that prongs N and L2 are connected to the motor. L2 is a "dead" wire (eg. not connected to the plug 38) and so the motor 20 is not powered. When the switch 24a is turned to the "on" position, the prongs L1 and N are connected to the motor. L1 and N are "live" wires (eg, connected to plug 38) and so electrical power is transferred to the motor 20.

Now referring to FIG. 4B, the powerhead 10 is attached to the pole assembly 12 via connectors 34 and 60. The trigger 58 on the second handle 54 actuates a second switch 58a on the pole assembly. Here actuation of the motor 20 is transferred from the first trigger 24 on the powerhead 10 to the second trigger 58 on the pole assembly. The switch 24a on the powerhead 10 is in the "off" position so that N and L2 are the "live" wires. When the second switch 58a is turned "on," it completes the circuit and actuation of the motor is conducted through prongs N and L2. Prong L1, which was "live" wire in the powerhead only mode, is now a "dead wire." Using this design, a simple and cost effective means is provided to transfer control of the powerhead from the powerhead trigger 24 to pole assembly trigger 58. Furthermore, this design prevents accidental actuation of the tool through powerhead trigger 24 while the pole assembly is attached.

Figure 5A:
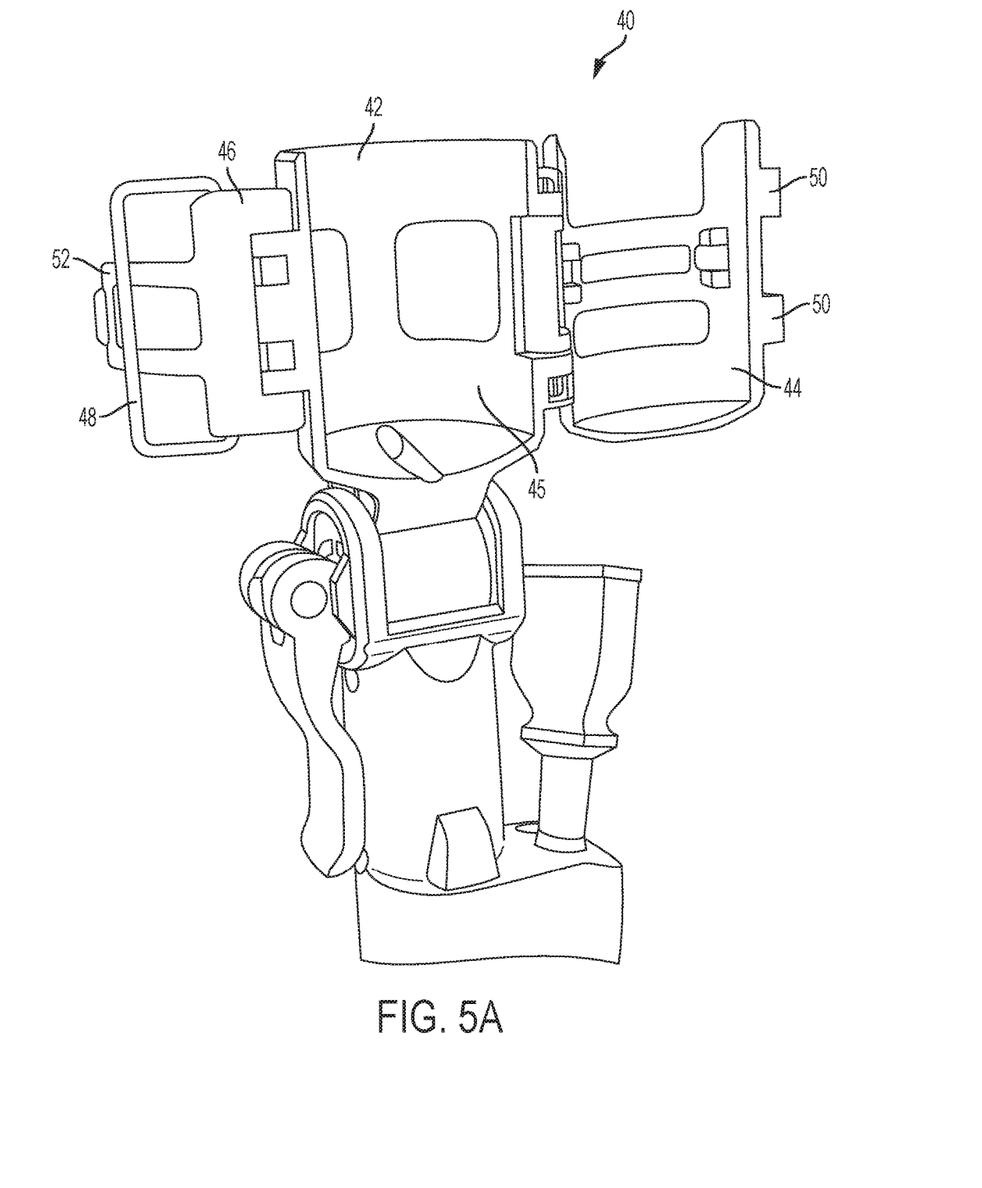
FIG. 5A is side view of a coupling member for the pole assembly in an open position.
Figure 5B:
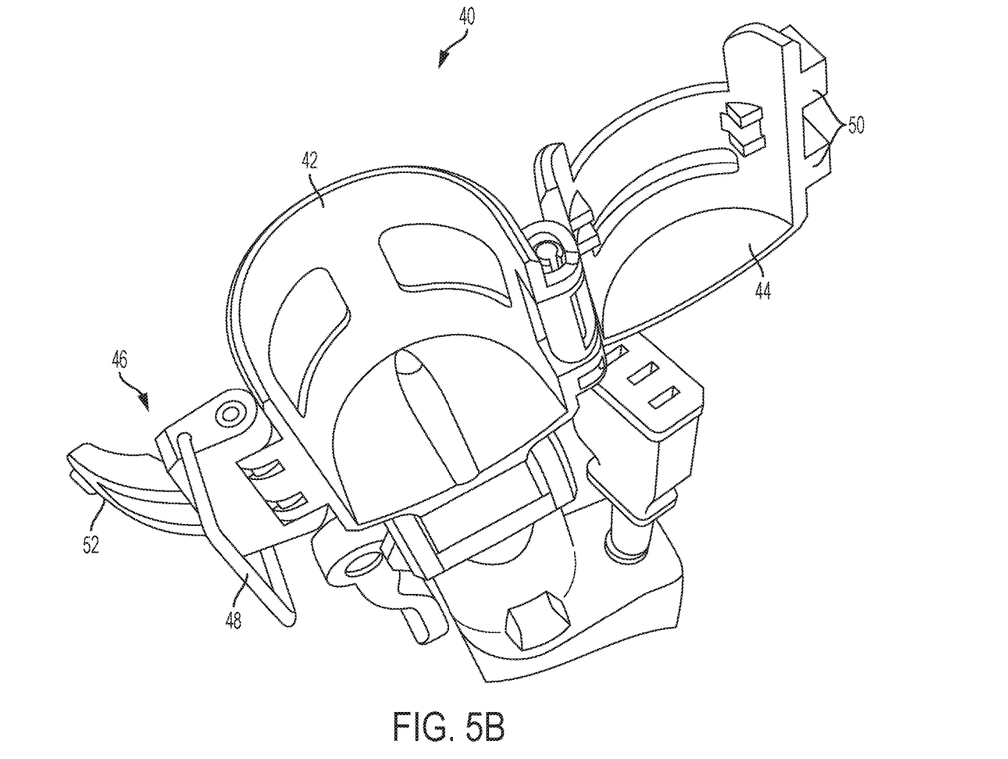
FIG. 5B is a top perspective view of the coupling member of FIG. 5A.

Now referring to FIGS. 5A and 5B, the coupling member 40 is shown in more detail. The figures show an over-center type of clamp, but it should be understood that any coupling mechanism can be used and fall within the scope of the invention. The coupling member 40 includes a first section 42 and a second section 44 that are hinged together to open and close, so that in a closed position, it defines a cavity 45. A locking latch 46 is also hingedly connected to the first section 42, to lock the second section 44 in a closed position. The locking latch 46 includes a bar 48 that swings over a pair of catches 50 on the second section 44. The latch 46 includes a gripping portion 52 for a user to lock or unlock the latch 46.

When joining the pole assembly 12 to the powerhead 10, the motor chamber 18 of the power head 10 is inserted into the cavity 45 of the coupling member 40. The second section 44 is then closed around the motor chamber 18 to engage the first section 42, and securely hold the power head 10. The bar 48 of the latch 46 is then swung over the catches 50, and the gripping portion 52 can be rotated to lie against the first section 42, which is the locked position. The locked position can be seen in FIGS. 6A and 6B (power head not shown).

By isolating the motor chamber 18 of the housing, a easily accessible and rigid section of the powerhead is provided for attaching the coupling member 40 of the pole assembly. Also, by locating the power cord 30 on the main handle 22, away from the motor chamber 18, the power cord does not interfere with the coupling of the pole assembly 12. Additionally, the motor chamber 18 has a slightly oval shape so that coupling member 40 rotatably aligns the powerhead 10 with the pole assembly 12. It should be understood that the motor chamber can have any shape, although it is preferred that it be one that automatically aligns the powerhead relative to the pole assembly.

Figure 6A:
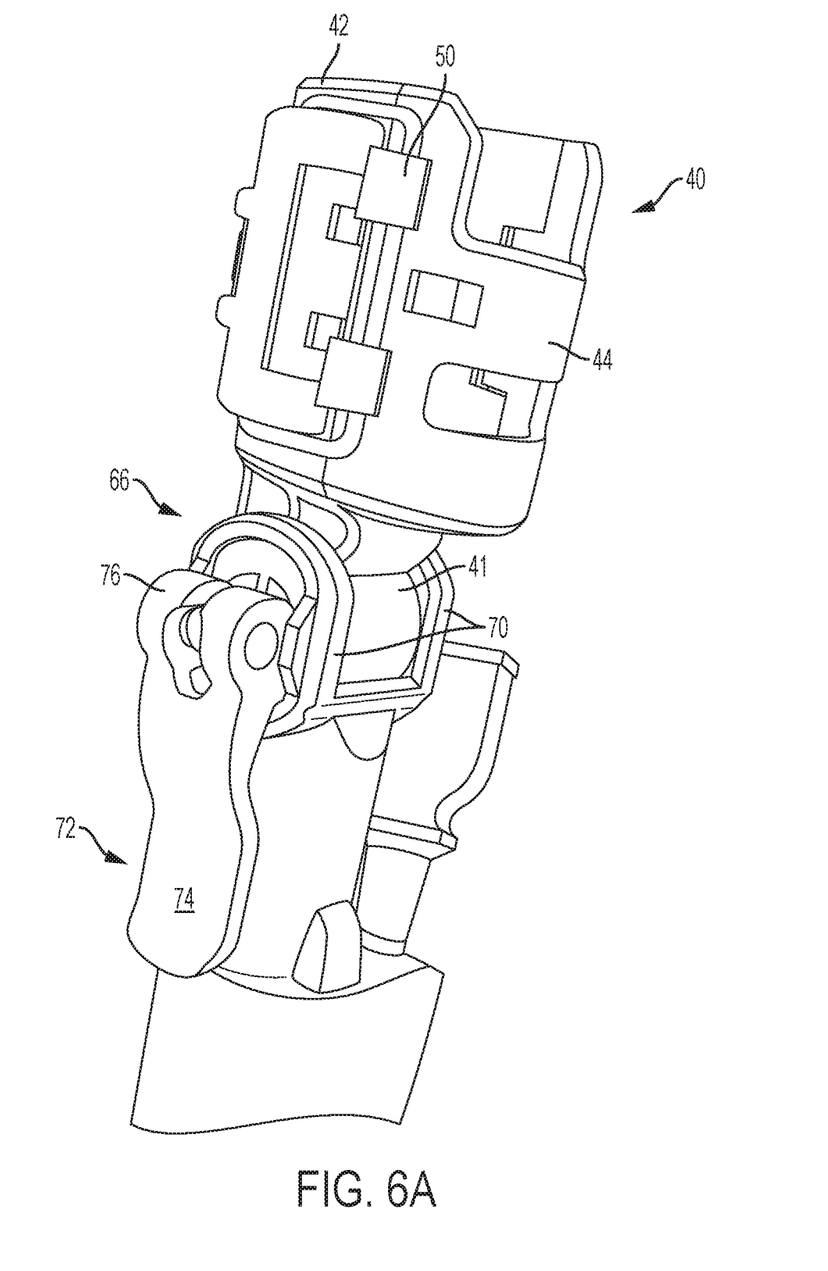
FIG. 6A is a side view of the coupling member of FIG. 5A in a closed position.
Figure 6B:
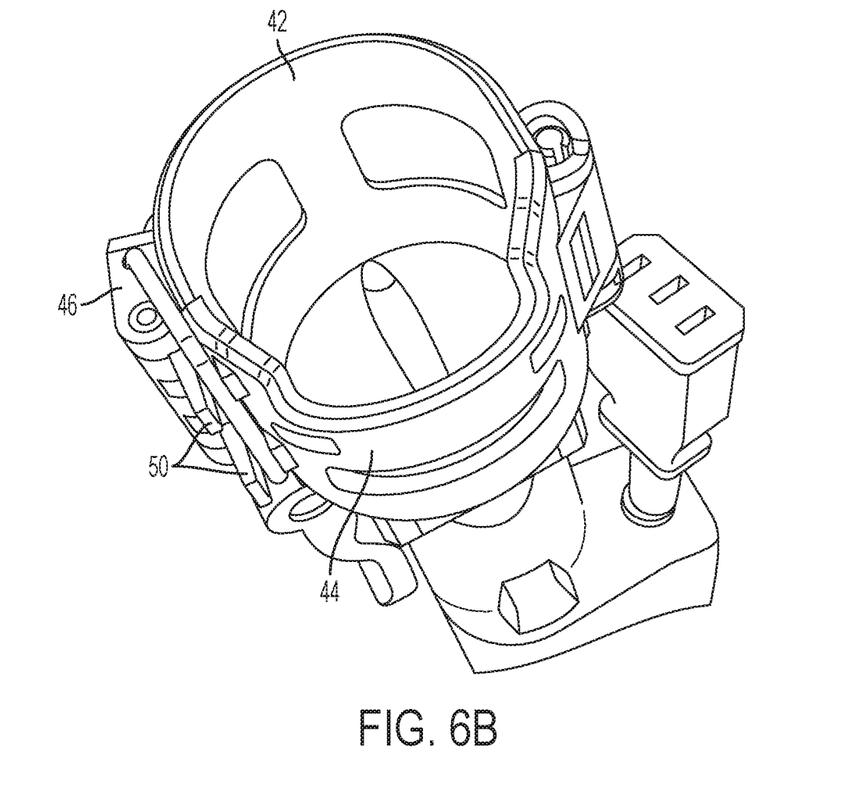
FIG. 6B is a top view of the coupling member of FIG. 5A in a closed position.
Figure 7:
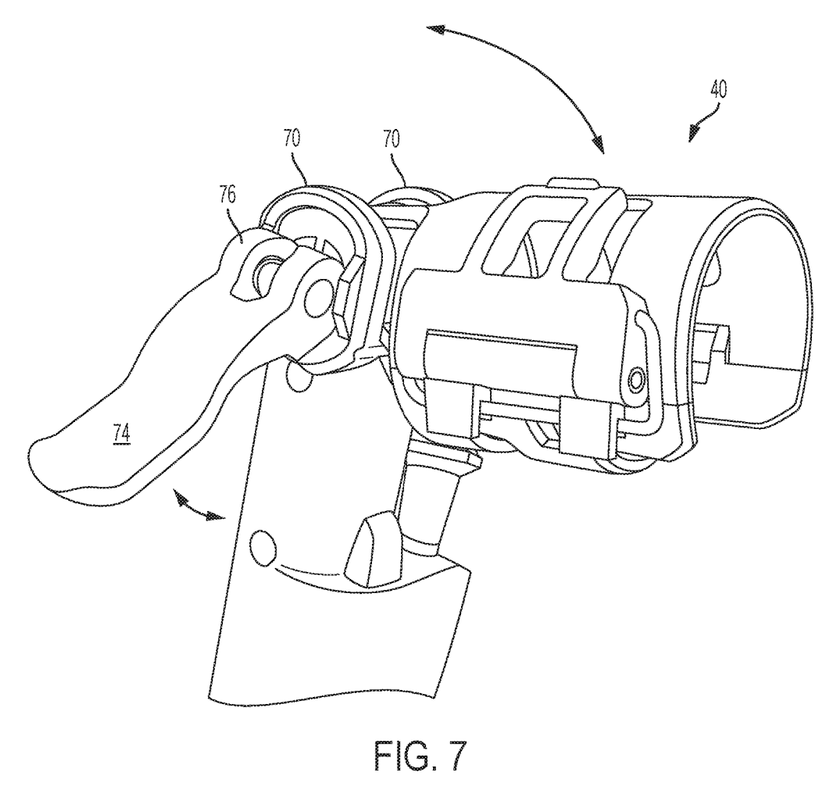
FIG. 7 shows the coupling member in a pivoted position.

Now referring to FIGS. 6A and 7, a further embodiment of the invention will now be described. The figures show that the coupling member 40 can be pivotably attached to the pole assembly 12. The coupling member 40 includes a spindle 41 extending from its end, and secure within a bracket 66 on the pole assembly 12. The bracket 66 has two ears 70 that support the spindle 41 on opposite sides. An pin (not shown) goes through the ears 70 and spindle 41 allowing the coupling member 40 to rotate. A lever 72 is secured to one end of the pin. The lever 72 includes a handle 74 and a cammed end portion 76 that urges the ears 70 toward one another to pivotally lock the coupling member 40 in position. FIG. 6A shows the locked position and FIG. 7 shows an unlocked position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure

The invention claimed is:

1. A powered garden tool comprising:
    a powerhead having a housing, the housing having an motor chamber for holding an electric motor, a main handle capable of being gripped by a user and having a generally longitudinal axis extending rearwardly from a front portion of the housing, the main handle having a first trigger to turn the motor on or off, wherein the motor has a longitudinal axis which extends rearwardly from the front portion of the housing such that the main handle and motor chamber are generally parallel to each other;
a blade assembly driveably connected to the motor and extending out from the front portion of housing;
a pole assembly having a coupling member capable of removably connecting to the motor chamber of the powerhead for use in a poled configuration; wherein the powerhead includes a first power cord, the first power cord having at least three electrical contacts; an adapter that connects to the first power cord on the powerhead for use in a hand-held configuration when no pole assembly is attached to the powerhead, the adapter capable of connecting to a power outlet; and wherein in a poled configuration when the pole assembly is attached to the powerhead, the first power cord is electrically connected to a second power cord on the pole assembly, and the second power cord is capable of connecting to the power outlet.

2. The powered garden tool of claim 1, wherein the pole assembly includes a second trigger, and when the tool is in the poled configuration, the second trigger is used to actuate power to the motor.

3. The powered garden tool of claim 2, wherein in the poled configuration, the first trigger is in the off position.

4. The powered garden tool of claim 1 wherein the coupling member is a clamp that is secured to the outer housing of the motor chamber.

5. The powered garden tool of claim 1, wherein the powerhead is pivotable relative to the pole assembly.

* * * * *